United States Patent [19]

Jarmotz

[11] 4,143,352

[45] Mar. 6, 1979

[54] AUDIBLE SPEED INDICATOR

[76] Inventor: Paul Jarmotz, 343 McCormick Ave., State College, Pa. 16801

[21] Appl. No.: 819,010

[22] Filed: Jul. 26, 1977

[51] Int. Cl.² ............................................. B60Q 1/54
[52] U.S. Cl. ..................................... 340/53; 340/62; 340/670; 180/106
[58] Field of Search ................... 340/53, 62, 263, 670; 180/105 R, 105 E, 106, 110

[56] References Cited

U.S. PATENT DOCUMENTS

| 3,859,629 | 1/1975 | Komiyama et al. ................... 340/62 |
| 3,900,796 | 8/1975 | Rose .................................. 340/263 X |

Primary Examiner—Alvin H. Waring
Attorney, Agent, or Firm—Cushman, Darby & Cushman

[57] ABSTRACT

An audio vehicle speedometer in which two pulse trains, one having a frequency which varies as a function of vehicle speed and the other having a frequency which varies as a function of desired vehicle speed indicated by the manually set portion of a potentiometer, are produced and compared to produce a further pulse train having a frequency which varies as a function of the difference frequency between the first two trains. The further train is applied to a speaker to produce an audio pulse train whenever the vehicle speed exceeds the desired manually set speed.

12 Claims, 3 Drawing Figures

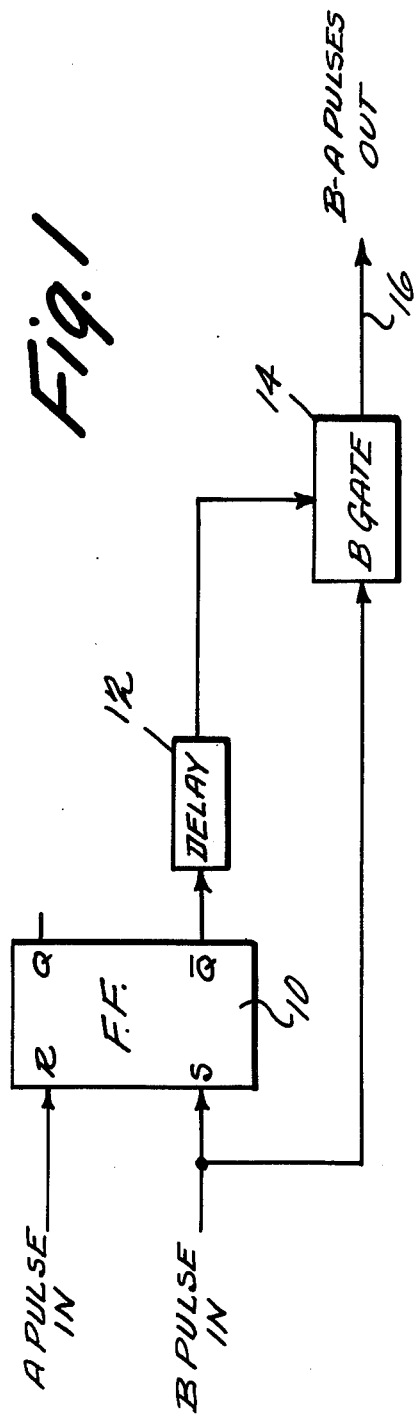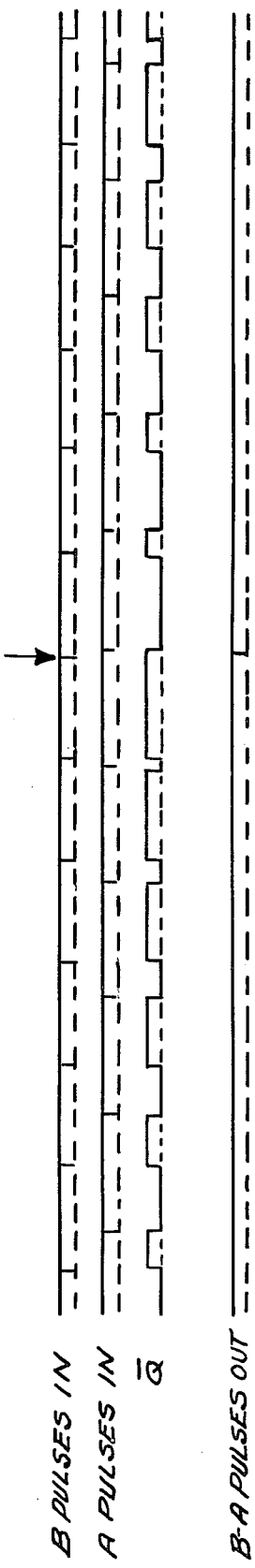

AUDIBLE SPEED INDICATOR

BRIEF DESCRIPTION OF THE PRIOR ART AND SUMMARY OF INVENTION

The invention relates to an apparatus for producing audio pulses whose frequency varies as a function of the speed of a vehicle above a predetermined speed.

It is quite demanding on the driver of an automobile to control the speed of his automobile using the visual speedometer. Having to continuously glance at the visual speedometer interferes with the more important task of watching the road and steering the automobile. Controlling the speed of the automobile with the visual speedometer demands constant and annoying interruptions in the task of watching the road, making the job of driving safely more difficult. Moreover, while a driver's vision is overloaded, his hearing capabilities are underused in driving his automobile.

The present invention relates to an apparatus which employs a simple and effective electronic circuit to produce a train of audio pulses having a frequency which varies as a function of the speed of the vehicle, at least above a predetermined speed. The frequency of the audio pulses increases and the amplitude decreases with increases in the speed of the vehicle. Since one's hearing is very sensitive to changes in the frequency of the sounds, the driver reacts very sensitively and accurately to changes in the speed of the vehicle. The driver's speed control with such an apparatus becomes reflexive and he can give all his attention to watching the road and steering, controlling the speed of the vehicle without the necessity of watching the speedometer at the same time.

The audio speed indicator sounds are not annoying because they are so powerfully useful to the driver. When the automobile changes speed, the driver wants to know that change and the audio pulses produced by the apparatus are the best way to do this. The sounds are reassuring and comforting because they respond predictably and sensitively to the speed of the automobile, increasing the pleasure and safety of driving.

In the specific embodiment of the invention described in detail below, the circuitry includes a speed sensor for producing a pulse train having a frequency which is directly proportional to vehicle speed. This can be accomplished, for example, with the conventional magnetic pick-ups of the types utilized to produce electrical signals for speed controllers. A second pulse train is produced having a frequency which varies as a function of a manual setting and is accordingly related to a specific desired speed. The frequencies of these two pulse trains are compared and a third pulse train is produced to drive a speaker to produce an audio pulse train which has a frequency which is directly proportional to the difference between the frequencies of the first two pulse trains and which is produced only when the frequency of the pulse train corresponding to the desired speed is exceeded by the frequency of the pulse train of the vehicle speed.

More particularly, the first pulse train circuit preferably includes a pulse shaping Schmitt trigger circuit driven by pulses from a magnetic pick-up on the speedometer cable. The pulse shaping circuit output is one input of an RS flip-flop which may be a pair of cross-connected NAND gates. The second pulse train circuit may be a blocking oscillator connected to a potentiometer, the position of which can be adjusted in accordance with a desired manual setting corresponding to any desired speed. The output of the blocking oscillator is by way of a JK flip-flop the other input of the RS flip-flop. The output of the RS flip-flop after going through a simple lumped delay circuit is one input to a third NAND gate and the inverted output of the pulse shaping circuit connected to the magnetic pick-up is the other input to this NAND gate. The NAND gate output frequency is directly proportional to the difference frequency between the pulses produced by the magnetic pick-up in response to the vehicle speed and the pulses produced by the JK flip-flop connected to the blocking oscillator as a function of the manual setting of the potentiometer.

The output of this NAND gate is applied to another JK flip-flop to produce pulses which trigger an SCR which drives a tweeter speaker to produce a series of audio pulses having a frequency which indicates to the vehicle driver, when he has exceeded his desired speed, the amount by which he has exceeded it. No sound is produced by this audible speed indicator when the vehicle speed is less than the desired speed, although the circuitry can be modified to provide a different type of audio or other indication for that condition.

Many other objects and purposes of the invention will be clear from the following detailed description of the drawings.

BRIEF DESCRIPTION OF THE DRAWINGS:

FIG. 1 shows a block diagram of the unique circuitry of this invention;

FIG. 3 shows a timing diagram illustrating the operation of the embodiment of FIGS. 1 and 2.

Figure 2:
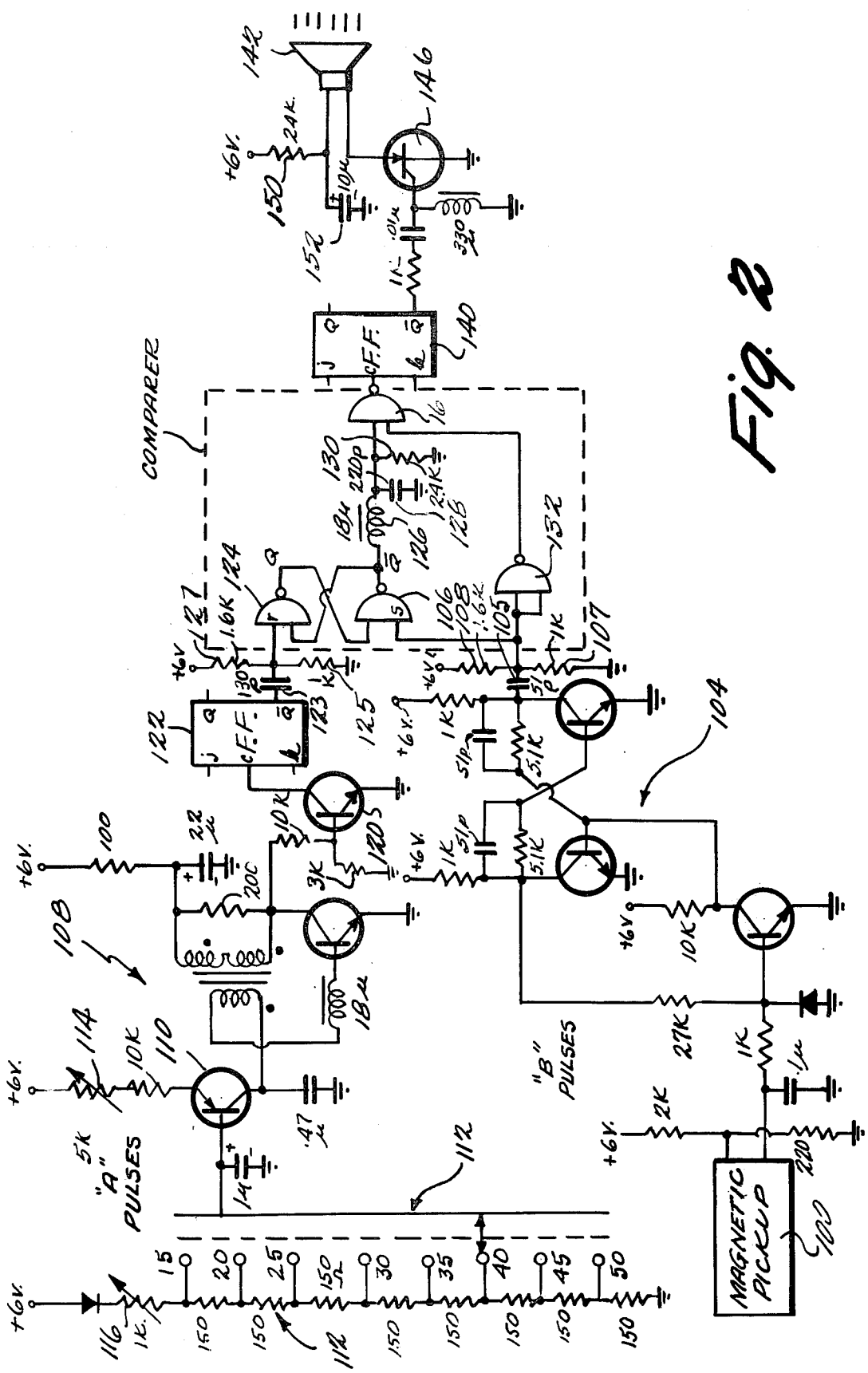
FIG. 2 shows a detailed schematic of one embodiment of the apparatus of this invention.

DETAILED DESCRIPTION OF THE DRAWINGS:

Reference is now made to FIG. 1 which is a block diagram of one embodiment of this application. "A" pulses which can be varied in frequency by a manual setting are applied to the R input of flip-flop 10. "B" pulses whose frequency is directly proportional to the vehicle speed are applied to the S input of flip-flop 10. "A" pulses shift flip-flop 10 to the state where a logical 1 appears at the "Q" output and a logical 0 at the "Q̄" output. Similarly "B" pulses shift flip-flop 10 to the state where a logical 1 appears at the "Q̄" output and a logical 0 at the "Q" output. The "Q̄" output of flip-flop 10 is delayed by lumped delay circuit 12 and then applied as enabling input to gate 14. The "B" pulses are also applied to gate 14 which produces an output pulse on output 16 only when the output of the lumped delay circuit 12 is logical 1. The delay circuit prevents gate 14 passing the "B" pulses which shift flip-flop 10. For gate 14 to pass a "B" pulse, two "B" pulses on the S input must be received without receipt of an "A" pulse on the R input. The frequency of the output of gate 14 thus is the difference in frequency between the two pulse trains which are applied to flip-flop 10 when the frequency of the "B" pulses is greater than the frequency of the "A" pulses.

Referring now to FIG. 2, which illustrates one detailed schematic of the arrangement illustrated in block diagram in FIG. 1, pulses produced by magnetic pick-up 100 are applied to the input of a type of Schmitt trigger pulse shaping circuit 104. Circuit 104 produces and applies steep wavefront rectangular pulses to the differentiating circuit comprising capacitor 105 and resistors 107 and 108. The output of this differentiating circuit is the pulse train "B" in FIGS. 1 and 3 and the input to NAND gate 106 which together with NAND gate 124 comprises RS flip-flop 10 in FIG. 1. Differentiation of the output of pulse shaping circuit 104 is necessary because flip-flop 10 requires very short pulses to work properly.

A conventional blocking oscillator 108 having a frequency substantially independent of the "B" pulses and the source voltage is connected by transistor 110, which makes the timing capacitor current independent of the voltage across the timing capacitor, to potentiometer 112 which constitutes a manual control and which can be set at any number of taps or positions each corresponding as illustrated to a predetermined set speed. Resistors 114 and 116 are adjustable in order to calibrate the manual control.

The output of blocking oscillator 108 is applied by transistor 120 to the clock input of JK flip-flop 122 which produces and applies steep wavefront rectangular pulses to the differentiating circuit comprising capacitor 123 and resistors 125 and 127. The output of this differentiating circuit is the pulse train "A" in FIGS. 1 and 3 and the input to NAND gate 124 which together with NAND gate 106 comprises the RS flip-flop 10 in FIG. 1. The output of RS flip-flop 10 is applied via a lumped delay circuit comprising inductor 126, capacitor 128, and resistor 130 to NAND gate 16 in FIG. 2.

Gate 16 also has applied to it the "B" pulses from circuit 104 which are inverted by NAND gate 132. When the output of the lumped delay circuit is high, pulses from NAND gate 132 are applied to the clock input of JK flip-flop 140. The output of JK flip-flop 140 triggers SCR 146 to produce audible pulses from tweeter speaker 142. Resistor 150 connecting the SCR to the supply voltage via the tweeter speaker causes the SCR to switch off.

As can be seen with reference to FIG. 3, each time two "B" pulses occur between adjacent "A" pulses, gate 14, FIG. 1, produces an output pulse and accordingly the frequency of the pulse train at the output of gate 14 is directly proportional to the difference in frequency between the "A" and "B" pulse trains when the frequency of the "B" pulse train is greater than the frequency of the "A" pulse train.

There is another aspect of this invention which is significant. The circuitry is purposely designed so that the sound intensity of the audio output decreases as the frequency of the output audio pulse train produced by speaker 142 increases. The reason for this reduction in sound intensity is that as the frequency of the audio pulse train increases, the pulses would sound louder if the intensity of the pulses was kept the same for all frequencies and the audio pulse train usefulness decreases at the higher frequencies of the audio pulse train.

This sound intensity reduction with frequency is accomplished by the RC circuit comprising resistor 150 and capacitor 152.

Many changes and modifications in the above described embodiment can, of course, be carried out without departing from the scope thereof. Accordingly, that scope is intended to be limited only by the scope of the appended claims.

What is claimed is:

1. An apparatus for producing a train of audio pulses having a frequency which varies with the speed of a vehicle above a predetermined speed comprising:
    means for producing a first train of electrical pulses having a frequency which varies with the vehicle speed and increases with increase in vehicle speed;
    manual control means having a settable condition indicating a desired vehicle speed;
    means for producing a second train of electrical pulses having a frequency which varies with the condition of said manual control means;
    means for comprising said first and second pulse trains and producing a third train of electrical pulses having a frequency proportional to the difference between said frequencies of said first and second pulse trains when the frequency of said first pulse train exceeds the frequency of said second pulse train; and
    means for converting said third pulse train into a train of audio pulses.

2. An apparatus as in claim 1, wherein said manual control means includes a potentiometer having a number of selectable taps each associated with a given desired vehicle speed, and wherein said second pulse train producing means includes a blocking oscillator connected to said potentiometer.

3. An apparatus as in claim 2, wherein said second pulse train producing means further includes a JK flip-flop connected to the output of said blocking oscillator and differentiating means connected between said JK flip-flop and said comparing and producing means for producing said second pulse train.

4. An apparatus as in claim 1, wherein said comparing and producing means includes an RS flip-flop having one input connected to said first pulse train producing means for shifting to a first logic state when a pulse is received from said first pulse train producing means, a second input connected to said second pulse train producing means for shifting to a second logic state when a pulse is received from said second pulse train producing means and gate means having one input connected to said first pulse producing means and the other input connected to the output of said RS flip-flop for producing an output pulse of said third pulse train when said first pulse producing means produces a pulse and said RS flip-flop is in said first logic state.

5. An apparatus as in claim 4, wherein said RS flip-flop comprises a pair of cross-connected NAND gates and said gate means includes a NAND gate.

6. An apparatus as in claim 4, wherein said comparing and producing means includes means between said RS flip-flop and said gate means for delaying the change on the gate means.

7. An apparatus as in claim 14, wherein said converting means includes a JK flip-flop for producing output pulses when said gate means produces pulses, an SCR connected to said JK flip-flop for shifting to a conductive condition when said JK flip-flop produces an output pulse, a speaker connected to said SCR so that a current pulse flows through said speaker to produce an audio pulse when said SCR is shifted to said conductive condition, and a capacitor and resistor for coupling a voltage source to said speaker and SCR so that the SCR switches off.

8. Apparatus as in claim 7, including a capacitor and resistor for coupling a voltage source to said speaker so that the intensity of said audio pulses decreases as the frequency of said audio pulses increases.

9. An apparatus as in claim 1, wherein said first pulse train producing means includes a magnetic pickup for sensing the speed of the vehicle.

10. An apparatus as in claim 1, wherein said first pulse train producing means includes a pulse shaping circuit and differentiating means connected between said pulse shaping circuit and said comparing and producing means for producing said first pulse train.

11. An apparatus providing an audio output indicating vehicle speed with manual control means for setting any of a number of discrete speeds, speed sensing means producing electrical pulses whose frequency is proportional to the vehicle speed and electro-mechanical means producing the audio output, the audio output being a train of audio pulses with a frequency proportional to the difference between the vehicle speed and the set speed when and only when the vehicle speed is greater than the set speed.

12. An apparatus as in claim 11, wherein said train of audio pulses intensity decreases as the said train of audio pulses frequency increases and said train of audio pulse intensity increases as the said train of audio pulses frequency decreases.

* * * * *